United States Patent [19]

Ozaki et al.

[11] Patent Number: 4,677,166
[45] Date of Patent: Jun. 30, 1987

[54] HALOGENATED ETHYLENE RANDOM COPOLYMER

[75] Inventors: Yoshimi Ozaki, Funabashi; Eizo Sueoka, Yamaguchi, both of Japan

[73] Assignee: Mitsui Petrochemical Industries, Ltd., Tokyo, Japan

[21] Appl. No.: 795,587

[22] Filed: Nov. 6, 1985

[30] Foreign Application Priority Data

Nov. 8, 1984 [JP] Japan .................................. 59-234045

[51] Int. Cl.⁴ ............................................. C08F 8/22
[52] U.S. Cl. .................................. 525/334.1; 525/356
[58] Field of Search ............................ 525/334.1, 356

[56] References Cited

U.S. PATENT DOCUMENTS

| | | | |
|---|---|---|---|
| 4,113,805 | 9/1978 | Frey et al. | 525/334.1 |
| 4,144,203 | 3/1979 | Hoehne et al. | 525/334.1 |
| 4,471,098 | 9/1984 | Naiman et al. | 525/334.1 |

FOREIGN PATENT DOCUMENTS

| | | |
|---|---|---|
| 0060609 | 9/1982 | European Pat. Off. . |
| 133294 | 2/1985 | European Pat. Off. . |
| 986995 | 3/1965 | United Kingdom . |

*Primary Examiner*—Joseph L. Schofer
*Assistant Examiner*—Bernard Lipman
*Attorney, Agent, or Firm*—Armstrong, Nikaido, Marmelstein & Kubovcik

[57] ABSTRACT

A halogenated product of a low-molecular weight ethylene random copolymer comprising ethylene and at least one alpha-olefin having 3 to 20 carbon atoms, wherein:

(i) the starting low-molecular weight ethylene random copolymer contains 30% to 75% by mole of the ethylene component and 25% to 70% by mole of the alpha-olefin component;

(ii) the halogen content of the halogenated product is 5% to 75% by weight;

(iii) the intrinsic viscosity [$\eta$] of the halogenated product is 0.01 to 0.5 dl/g determined at 135° C. in decalin;

(iv) the molecular weight distribution $\overline{M}w/\overline{M}n$ of the halogenated product, wherein $\overline{M}w$ and $\overline{M}n$ represent a weight-average molecular weight and a number-average molecular weight, respectively, determined by gel permeation chromatography is 5 or less; and (v) the number-average molecular weight of the halogenated product is 300 to 1000, determined by gel permeation chromatography.

This halogenated ethylene random copolymer has an excellent solubility in solvents and excellent compatibility to various kinds of resins and lubricating oils. Especially, the halogenated ethylene random copolymer is suitable for use as a modifier for halogen-containing polymer such as polyvinyl chloride and polyvinylidene chloride, a compounding agent for, for example, a lubricating oil, a paint composition, an ink composition, an adhesive, a tackifier, and a thickening agent, and a flame retardant.

10 Claims, No Drawings

HALOGENATED ETHYLENE RANDOM COPOLYMER

BACKGROUND OF THE INVENTION

1. Field of the Invention

The present invention relates to a novel halogenated ethylene random copolymer. More specifically, it relates to a halogenated ethylene random copolymer having an excellent solubility in solvents and excellent compatibility to various kinds of resins and lubricating oils. Especially, the halogenated ethylene random copolymer is suitable for use as a modifier for halogen-containing polymer such as polyvinyl chloride and polyvinylidene chloride, a compounding agent (or an additive) for, for example, a lubricating oil, a paint composition, an ink composition, an adhesive, a tackifier, and a thickening agent, and a flame retardant.

2. Description of the Related Art

Heretofore, the chlorinated products of olefin polymers having a high molecular weight such as polyethylene, polypropylene, and ethylene-propylene copolymer are well-known in the art as disclosed in, for example, U.S. Pat. No. 2996473. These modified ethylene polymers are heretofore used as a modifier for halogen-containing polymers such as polyvinyl chloride, and also as a compounding agent for a paint and an ink. Furthermore, it is proposed in, for example, U.S. Pat. No. 3628924 that the chlorinated products of low-molecular weight olefin polymers such as paraffins and waxes can be used in the similar fields. However, of these known chlorinated products, the former chlorinated modified products of the high molecular weight olefin polymers have insufficient solubility and compatibility and, therefore, practically acceptable and sufficient properties thereof cannot be generally obtained when used in the above-mentioned application fields. On the other hand, the latter chlorinated products of low-molecular weight polymers such as paraffins and waxes have disadvantages in that the control of the desired molecular weight and molecular weight distribution is difficult and, therefore, practically acceptable and sufficient properties thereof cannot be generally obtained when used in the above-mentioned application fields.

SUMMARY OF THE INVENTION

Accordingly, the objects of the present invention are to eliminate the above-mentioned disadvantages of conventional halogenated products of olefin polymers and to provide the halogenated products of ethylene random copolymer having excellent compatibility to various solvents and polymers and also capable of providing excellent properties as a modifier for halogen-containing polymers and as a compounding agent for paints, inks, adhesives, tackifiers, and thickeners.

Other objects and advantages of the present invention will be apparent from the following description.

In accordance with the present invention, there is provided a halogenated product of a low-molecular weight ethylene random copolymer comprising ethylene and at least one alpha-olefin having 3 to 20 carbon atoms (i.e., "halogenated ethylene random copolymer"), wherein:

(i) the low-molecular weight ethylene random copolymer contains 30% to 75% by mole of the ethylene component and 25% to 70% by mole of the alpha-olefin component;

(ii) the halogen content of the halogenated ethylene random copolymer is 5% to 75% by weight;

(iii) the intrinsic viscosity [$\eta$] of the halogenated ethylene random copolymer is 0.01 to 0.5 dl/g determined at 135° C. in decalin;

(iv) the molecular weight distribution $\overline{M}w/\overline{M}n$ of the halogenated ethylene random copolymer, wherein $\overline{M}w$ and $\overline{M}n$ represent a weight-average molecular weight and a number-average molecular weight, respectively, determined by gel permeation chromatography is 5 or less; and (v) the number-average molecular weight of the halogenated ethylene random copolymer is 300 to 10000, determined by gel permeation chromatography.

DESCRIPTION OF THE PREFERRED EMBODIMENT

The halogenated ethylene random copolymers according to the present invention are those obtained by halogenating low-molecular weight ethylene random copolymers composed of ethylene and alpha-olefins having 3 to 20 carbon atoms. The halogen content of the present halogenated ethylene random copolymer is 5% to 75% by weight, preferably 10% to 50% by weight and, more preferably, 20% to 45% by weight. When the halogen content is smaller than 5% by weight, the desired properties cannot be obtained. In contrast, when the halogen content is larger than 75% by weight, the solubility in solvents and the compatibility to various resins or lubricating oils are undesirably decreased. The halogen usable in the present invention is fluorine, chlorine, bromine, and iodine. Of these halogen atoms, the use of chlorine is most preferable in the present invention.

The present halogenated ethylene random copolymer has an intrinsic viscosity [$\eta$], determined at 135° C. in decalin, of 0.01 to 0.5 dl/g, preferably 0.01 to 0.3 dl/g, a number-average molecular weight of 300 to 10000, preferably 300 to 5000, more preferably 500 to 4000, and a molecular weight distribution $\overline{M}w/\overline{M}n$ of 5 or less, preferably 1.5 to 3. When the intrinsic viscosity or the number-average molecular weight is too small, the coatings become sticky and the mechanical strength is decreased in the case where the halogenated ethylene random copolymer is incorporated into paint or ink compositions. In contrast, when the intrinsic viscosity or the number-average molecular weight is too large, the solubility in solvents becomes poor. Furthermore, when the molecular weight distribution is too large, the flash point is undesirably decreased and the pour point is undesirably increased, in the case where the halogenated ethylene random copolymer is incorporated into lubricating oils.

The low-molecular weight liquid ethylene random copolymer used in the preparation of the present halogenated product contains (a) 30% to 75% by mole, preferably 40% to 60% by mole, of the ethylene component and (b) 25% to 70% by mole, preferably 40% to 60% mole, of the alpha-olefin component in which the total amounts of the components (a) and (b) are 100% by mole. When the ethylene content is too small, the thermal stability of the halogenated product and the weathering resistance of the halogenated product becomes poor, whereas when the ethylene content is too large, the solubility of the halogenated product in solvents is decreased.

The low-molecular weight liquid ethylene random copolymer preferably has an intrinsic viscosity [$\eta$], determined at 135° C. in decalin, of 0.01 to 0.5 dl/g, preferably 0.01 to 0.35, more preferably 0.01 to 0.3 dl/g, a number-average molecular weight of 300 to 10000, preferably, 300 to 5000, more preferably 500 to 3000, and a molecular weight distribution $\overline{Mw}/\overline{Mn}$, determined by a GPC method, of 1 to 3, more preferably 1.5 to 2.8. When the intrinsic viscosity or the number-average molecular weight of the low-molecular weight ethylene random copolymer is too small, the thermal stability of the halogenated product and the weathering resistance of the halogenated product become poor, whereas when the intrinsic viscosity or the number-average molecular weight is too large, the solubility of the halogenated product in solvents is decreased. When the molecular weight distribution is too large, the flash point is undesirably decreased and the pour point is undesirably increased, in the case where the halogenated ethylene random copolymer is incorporated into lubricating oils.

The low-molecular weight liquid ethylene random copolymer used in the preparation of the present halogenated product preferably has a Z value (i.e., a ratio of the maximum molecular weight of the copolymer to the minimum molecular weight of the copolymer) of 15 to 300, more preferably 15 to 200 and a $\sigma$ value of 0.05 to 2, more preferably 0.1 to 1. The above-mentioned range of the Z value means that the molecular weight distribution of the starting ethylene random copolymer is nearly a normal distribution. The starting ethylene random copolymer having the above-mentioned range of the $\sigma$ value has good transparency (i.e., not opaque).

The Z value of the low-molecular weight ethylene/alpha-olefin random copolymer can be determined as follows:

The number-average molecular weight and weight-average molecular weight of the copolymer (i.e., unhalogenated and halogenated copolymer) are measured according to a method as disclosed in, for example, Journal of Polymer Science, Part A-II, vol. 8, pages 89–103 (1970).

That is, elution counts of a standard substance having a known molecular weight (e.g., 16 samples of monodisperse polystyrene having different molecular weights selected from the range of 500 to $840 \times 10^4$) are measured by GPC, and a calibration curve showing the relation between the molecular weight and the elution count is prepared. The GPC pattern of a copolymer sample is taken by GPC. From the calibration curve, the molecular weights (Mi) at the individual counts (i) are read, and from the GPC pattern, the elution volumes (Ni) at the individual counts (i) are read. The number average molecular weight ($\overline{Mn}$) and weight average molecular weight ($\overline{Mw}$), both as polystyrene, of the copolymer sample can be calculated in accordance with the following equations.

$$\overline{Mn} = \Sigma MiNi/\Sigma Ni$$

$$\overline{Mw} = \Sigma Mi^2 Ni/\Sigma MiNi$$

Separately, the molecular weight, calculated as polystyrene, of squalane (i.e., isoparaffinic standard substance having a molecular weight of 422) is measured by GPC. The minimum and maximum elution counts of the GPC pattern of the copolymer are read, and the corresponding minimum and maximum molecular weights of the copolymer, calculated as polystyrene, are read from the calibration curve. The Z value is thus calculated from the following equation.

$$Z \text{ value} = \frac{\text{Maximum molecular weight of the copolymer as polystyrene}}{\text{Minimum molecular weight of the copolymer as polystyrene}}$$

The $\sigma$ value can be calculated from the following equation.

$$\overline{E} = \sum_i EiWi/\sum_i Wi$$

$$\sigma = \sqrt{\sum_i (Ei - \overline{E})^2 Wi}$$

The copolymer is fractionated with acetone/hexane mixed solvent having various mixing proportions, and the ethylene content (Ei) and the weight ratio (Wi), based on the total weight of the copolymer, of the copolymer extracted in the i-th fraction are determined. The $\sigma$ value represents a composition distribution of the copolymer.

The alpha-olefins having 3 to 20 carbon atoms usable in the preparation of the low-molecular weight ethylene random copolymer include, for example, propylene, 1-butene, 1-pentene, 1-hexene, 3-methyl-1-pentene, 4-methyl-1-pentene, 1-octene, 1-decene, 1-dodecene, 1-tetradecene, 1-hexadecene, 1-octadecene, and 1-eicosene. These alpha-olefins may be used alone or in any mixture thereof. Of these alpha-olefins, the use of propylene, 1-butene, or 1-hexene is preferable in the practice of the present invention.

The low-molecular weight liquid ethylene random copolymer used in the preparation of the halogenated random copolymer can be prepared by copolymerizing ethylene and an alpha-olefin or alpha-olefins in a manner disclosed in, for example, Japanese Unexamined Patent Application (Kokai) No. 57-117595 and European Patent Application 60609 (A1). The content of these references is incorporated into the present specification.

The halogenated ethylene random copolymer according to the present invention can be prepared by reacting the above-mentioned low-molecular weight liquid ethylene random copolymer with halogen. This halogenation reaction can be carried out in the presence or absence of a catalyst conventionally used in the halogenation and in the presence or absence of a solvent capable of dissolving the starting low-molecular weight liquid ethylene random copolymer.

Examples of the catalyst usable in the halogenation reaction are organic peroxides such as benzoyl peroxide and di(tert-butyl)peroxide, azobis (cyano alkanes) such as $\alpha,\alpha'$-azobisisobutyronitrile and azocyclohexane carbonitrile, lights, especially a UV light, and water. Examples of the solvent usable in the halogenation reaction are carbon tetrachloride, benzene, chlorinated benzenes, chloroform, tetrachloroethane, and dichlorofluoromethane. Although there are no critical limitations to the reaction temperature, the halogenation reaction is generally carried out at a temperature of 30° C. to 150° C., preferably 50° C. to 120° C. The reaction time is optionally selected from 0.5 to 20 hours, preferably 1 to 10 hours. The halogenation reaction is carried out until the halogen content of the halogenated ethylene random copolymer becomes 5% to 75% by weight, preferably 10% to 50% by weight. The halogenation reaction can be carried out in either batchwise, continuous, or semi-continuous way. The halogenated reaction product can be recovered by treating the reaction product mixture in any conventional manner. For example, after the completion of the reaction, the hydrogen halide and/or halogen gas dissolved in the reaction mixture are removed by blowing, for example, nitrogen gas into the reaction mixture. When the solvent is used in the reaction, the solvent is removed by vaporization in vacuo or under atmospheric pressure. Thus, the desired halogenated ethylene random copolymer can be obtained. The halogenated ethylene random copolymer according to the present invention has an excellent solubility in various solvents and excellent compatibility to various kinds of resins and lubricating oils. Accordingly, the halogenated ethylene random copolymer according to the present invention can be advantageously used as a modifier for halogen-containing polymer such as polyvinyl chloride and polyvinylidene chloride, a compounding agent for, for example, a lubricating oil, a paint composition, an ink composition, an adhesive, a tackifier, and a thickening agent, and a flame retardant.

EXAMPLE

The present invention will be further explained by, but is by no means limited to, the following Examples and Comparative Examples.

EXAMPLE 1

A 1.5 kg amount of a low-molecular weight liquid ethylene-propylene random copolymer having an ethylene content of 54 mole %, an intrinsic viscosity $[\eta]$, determined at 135° C. in decalin, of 0.081 dl/g, an $\overline{M}n$ of 1500, and $\overline{M}w/\overline{M}n$ of 2.5, a Z value of 175, and a $\sigma$ value of 0.3 was charged into a 5 liter glass reactor. Chlorine gas was continuously introduced with stirring at a rate of 60 l/hr at a temperature of 80° C. to 90° C. under an atmospheric pressure for 2.5 hours, while irradiating light from 30 W fluorescent tube. After the completion of the chlorination reaction, a nitrogen gas was introduced into the reaction mixture to remove the dissolved chlorine and hydrogen chloride from the glass reactor.

Thus, the chlorinated ethylene random copolymer having a chlorine content of 29% by weight, an $[\eta]$ of 0.058, an $\overline{M}n$ of 1600, and an $\overline{M}w/\overline{M}n$ of 2.6 was obtained.

EXAMPLES 2 TO 5

Various liquid ethylene random copolymers having the characteristics listed in table 1 were chlorinated in the same manner as in Example 1. Thus, the chlorinated ethylene random copolymers were obtained. The results are shown in Table 1.

EXAMPLE 6

A liquid ethylene-hexene-1 copolymer having the characteristics listed in Table 1 was chlorinated in the same manner as in Example 1. Thus, the chlorinated ethylene random copolymers were obtained. The results are shown in Table 1.

COMPARATIVE EXAMPLES 1 TO 3

Various ethylene random copolymers having the characteristics listed in Table 1 were chlorinated in the same manner as in Example 1. Thus, the chlorinated ethylene random copolymers were obtained as comparative samples. The results are shown in Table 1.

TABLE 1

| | Ethylene Random Copolymer | | | | | | Chlorinated Ethylene Random Copolymer | | | |
|---|---|---|---|---|---|---|---|---|---|---|
| | Ethylene Content (mole %) | $(\eta)$ (dl/g) | $\overline{M}n$ | $\overline{M}w/\overline{M}n$ | Z value | $\sigma$ value | Cl content (wt %) | $(\eta)$ (dl/g) | $\overline{M}n$ | $\overline{M}w/\overline{M}n$ |
| Example | | | | | | | | | | |
| 1 | 54 | 0.081 | 1500 | 2.5 | 175 | 0.3 | 29 | 0.058 | 1600 | 2.6 |
| 2 | 54 | 0.081 | 1500 | 2.5 | 175 | 0.3 | 43 | 0.048 | 1600 | 2.6 |
| 3 | 46 | 0.03 | 580 | 2.1 | 50 | 0.3 | 26 | 0.024 | 610 | 2.2 |
| 4 | 55 | 0.065 | 1200 | 2.5 | 170 | 0.3 | 35 | 0.049 | 1300 | 2.7 |
| 5 | 55 | 0.029 | 550 | 2.3 | 30 | 0.3 | 34 | 0.023 | 590 | 2.4 |
| 6 | 57 | 0.048 | 910 | 2.2 | 110 | 0.4 | 40 | 0.039 | 970 | 2.3 |
| Comparative Example | | | | | | | | | | |
| 1 | 53 | 0.053 | 990 | 2.5 | 110 | 0.3 | 2 | 0.052 | 990 | 2.5 |
| 2 | 10 | 0.043 | 810 | 2.5 | 75 | 0.2 | 26 | 0.035 | 840 | 2.6 |
| 3 | 10 | 0.043 | 810 | 2.5 | 75 | 0.2 | 72 | 0.027 | 920 | 3.5 |

EVALUATION EXAMPLE 1

The compatibility of the chlorinated ethylene random copolymers obtained is Examples 1 to 6 and Comparative Examples 1 to 3 to various resins was evaluated. The results are as shown in Table 2.

The evaluation was carried out as follows.

A 0.2 g amount each of the chlorinated ethylene random copolymers was mixed with 0.2 g of each resin listed in Table 2 under a molten condition for 3 to 5 minutes on a hot plate at a temperature of 180° C. The compatibility was visually determined from the transparency of the coated film on a glass plate according to the following criteria:

3: Good transparency (i.e., good compatibility)
2: Fair transparency (i.e., fair compatibility)
1: Poor transparency (i.e., poor compatibility)

In the case of polystyrene (i.e., "PS") and polychloroprene (i.e., "CR"), a toluene solution containing 30% by weight of a 1/1 (by weight ratio) mixture of the chlorinated ethylene random copolymer and the resin was prepared. The compatibility was evaluated in the same manner as mentioned above from the visual observation of the transparency of the film, which was obtained by coating the above-prepared toluene solution on a glass plate, followed by drying at a temperature of 80° C. for 20 minutes.

In the case of polyvinyl chloride resin (i.e., "PVC"), the compatibility was evaluated in the same manner as in the case of PS and CR, except that a tetrahydrofuran solution containing 5% by weight of a 1/1 (by weight ratio) mixture of the chlorinated ethylene random copolymer and PVC was used.

The polymers used in the evaluation were as follows:
SIS: Polystyrene.polyisoprene.polystyrene block copolymer TR-1107 available from Shell Chemical Co.
CR: Polychloroprene M-40 available from Denki Kagaku Kogyo K.K.
PS: Polystyrene HF 77 available from Mitsubishi Monsanto Chemical Co.
PVC: Polyvinyl chloride 103EP available from Nippon Zeon Co., Ltd.
EVA: Ethylene.vinyl acetate copolymer #220 available from Mitsui Du'Pont Polychemical Co.

As a comparative test, the compatibility of chlorinated paraffin (A-70 available from Toyo Soda Manufacturing Co., Ltd., Cl content = 70 wt.%) is also shown in Table 2.

TABLE 2

| Chlorinated product | Example | | | | | | Comparative Example | | | Chlorinated paraffin |
|---|---|---|---|---|---|---|---|---|---|---|
| | 1 | 2 | 3 | 4 | 5 | 6 | 1 | 2 | 3 | |
| Compatibility | | | | | | | | | | |
| SIS | 3 | 3 | 3 | 3 | 3 | 3 | 3 | 2 | 2 | 3 |
| CR | 3 | 3 | 3 | 3 | 3 | 3 | 2 | 3 | 3 | 3 |
| PS | 3 | 3 | 3 | 3 | 3 | 3 | 2 | 2 | 2 | 2 |
| PVC | 3 | 3 | 3 | 3 | 3 | 3 | 1 | 3 | 2 | 3 |
| EVA | 3 | 3 | 2 | 3 | 3 | 3 | 1 | 2 | 3 | 2 |

EVALUATION EXAMPLE 2

Solubilities of the chlorinated ethylene random copolymer obtained in Example 2, the chlorinated paraffin used in the Evaluation Example 1, and chlorinated polyethylene (ELASLEN 401A available from Showa Denko K.K., Cl content=40 wt%) in various solvents were evaluated. The results are as shown in Table 3.

The evaluation test was carried out as follows. That is, 40 g of a sample was charged into 100 g of a solvent in a glass vessel. The content of the glass vessel was heated at a temperature of 80° C. for 1 hour while stirring. After cooling to room temperature, the dissolved condition of the sample was visually observed. The solubility was determined according to the following criteria:
A: Transparent solution (i.e., good solubility)
B: Poor transparency (i.e., poor solubility)

TABLE 3

| Chlorinated Product | | Example 2 | Chlorinated Paraffin | Chlorinated Polyethylene |
|---|---|---|---|---|
| Solubility | Toluene | A | A | B |
| | Carbon tetrachloride | A | A | B |
| | Chloroform | A | A | B |
| | Nitrobenzene | A | A | B |
| | Cyclohexanone | A | A | B |
| | Dioxane | A | A | B |

APPLICATION EXAMPLE 1

A 21.5 g amount of SIS (TR1107 available from Shell Chemical Co.), 21.5 g of petroleum resin (FTR 6100 available from Mitsui Petrochemical Industries, Ltd.), 0.5 g of a stabilizer (Irganox 1010 available from Chiba-Geigy Ltd.), and 6.5 g of a plasticizer (i.e., chlorinated ethylene random copolymer obtained in Examples 1 to 6, Comparative Examples 1 to 4, and chlorinated paraffin A-40 available from Toyo Soda Manufacturing Co., Ltd.) were mixed at a temperature of 150° C. for 30 minutes in a kneader. Thus, pressure-sensitive adhesives were prepared.

The pressure-sensitive adhesives were then coated, by an applicator, to the surface of a polyester film having a thickness of 25 μm on a hot plate at a temperature of 180° C. Thus, pressure sensitive adhesive tapes having a thickness of 50±5 μm were prepared. These tapes were subjected to the following tests.
Tackiness: J. Dow method
Adhesive force: JIS (i.e., Japanese Industrial Standard) Z 1524
Cohesive force: JIS Z 1524

The results are as shown in Table 4.

TABLE 4

| Chlorinated Ethylene Random Copolymer | Adhesive Tape Property | | |
|---|---|---|---|
| | Tackiness (Ball No.) | Adhesion Force (g/25 mm width) | Cohesive Force (mm/2 hr) |
| Example 1 | 14 | 2000 | 0.1 |
| Example 2 | 12 | 2200 | 0.1 |
| Example 3 | 10 | 1800 | 0.1 |
| Example 4 | 12 | 2200 | 0.1 |
| Example 5 | 10 | 2300 | 0.1 |
| Example 6 | 12 | 2000 | 0.1 |
| Comparative Example 1 | 8 | 1800 | 0.1 |
| Comparative Example 2 | 8 | 1300 | 0.1 |
| Comparative Example 3 | less than 2 | 800 | 0.1 |
| Chlorinated Paraffin | 10 | 1500 | 0.1 |

APPLICATION EXAMPLE 2

Sufficient weathering resistance is essential for paints. In order to evaluate the effectiveness of the chlorinated ethylene random copolymer as a plasticizer for paints, the chlorinated ethylene random copolymer obtained in Example 6 was used as a plasticizer for the preparation of an upper coating paint containing, as a main ingredient, chlorinated rubber. The resultant paint was evaluated by monitoring the change in brightness of the coating when a UV light was irradiated thereon.

The composition of the paint was as follows.

| Ingredient | Amount (g) |
|---|---|
| Chlorinated polyisoprene | 121 |
| Plasticizer | 10 |
| Titanium dioxide (available from Sakai Chemical Co.,) | 26 |
| Stabilizer (i.e., Epikote 828 available from Shell Chemical Co.) | 0.5 |
| Thixotropic agent (i.e., Bentone 34 available from BY-MALLINCKRODT) | 1.5 |
| Xylene | 41 |
| | (Total 100 g) |

The above-mentioned ingredients were mixed together in a sand mill. An epoxyzinc paint (Zinky, lower coating paint available from MITSU KINZOKU PAINTS & CHEMICAL CO., LTD.) was first coated on the surface of a sand blast steel plate and then the above-prepared upper coating paint was coated thereover with a coating brush. Thus, test piece plates were prepared. The test piece plates were naturally dried at an ambient condition for 5 days. Thereafter, the test piece plates were attached to a rotary drum and the test piece plates were irradiated by a 20 W high pressure mercury vapor lamp from a distance of 30 cm. The brightness was determined at each time given in the Table.

The results are as shown in Table 5. As a comparative test, the test results obtained by using chlorinated paraffin (A-40 available from Toyo Soda Manufacturing Co., Ltd.) in lieu of the chlorinated ethylene random copolymer in the above-mentioned application test are also shown in Table 5.

TABLE 5

| Irradiation Time (hr) | Example 6 | Chlorinated Paraffin |
| --- | --- | --- |
| 0 | 85% | 86% |
| 50 | 77% | 76% |
| 100 | 73% | 74% |
| 150 | 71% | 71% |

APPLICATION EXAMPLE 3

Burning tests were carried out by compounding the chlorinated ethylene random copolymer obtained in Example 2 into polyethylene.

The ingredients listed in Table 6 were thoroughly mixed, followed by blending the resultant mixture at a temperature of 145° C. for 10 minutes on a pair of rolls. The mixture was press molded in a press to obtain sheets, each having a width of 1 cm, a thickness of 1 mm, and a length of 10 cm.

The resultant sheets were subjected to a burning test according to a JIS K-6911 method. The results are shown in Table 6, together with the results obtained from the use of chlorinated paraffin (A-40 available from Toyo Soda Manufacturing Co., Ltd.) and chlorinated polyethylene (P-304 available from Osaka Soda Co., Ltd.)

TABLE 6

| Chlorinated Product | | Example 2 | Chlorinated Paraffin | Chlorinated Polyethylene | No Addition | No Addition |
| --- | --- | --- | --- | --- | --- | --- |
| Compounding | Polyethylene | 100 | 100 | 100 | 100 | 100 |
| Ratio | Chlorinated Product | 12 | 12 | 12 | 0 | 0 |
| (wt. part) | Sb$_2$O$_3$ | 6 | 6 | 6 | 11 | 0 |
| Burning Time (sec) | | 5.5 | 5.9 | 5.9 | ∞ | ∞ |
| Burning Distance (cm) | | 6.7 | 7.4 | 7.3 | ∞ | ∞ |
| Self-extinguishing property | | Yes | Yes | Yes | No | No |
| Molten falling | | No | No | No | Yes | Yes |

We claim:

1. A halogenated product of a low-molecular weight ethylene random copolymer comprising ethylene and at least one alpha-olefin having 3 to 20 carbon atoms, wherein:
   (i) the starting low-molecular weight ethylene random copolymer contains 30% to 75% by mole of the ethylene component and 25% to 70% by mole of the alpha-olefin component and has an intrinsic viscosity [η], determined at 135° C. in decalin of 0.01 to 0.5 dl/g, a number-average molecular weight of 300 to 10000, a molecular weight distribution $\overline{M}w/\overline{M}n$, determined by gas permeation chromatography, of 1 to 3, a Z value of 15 to 300, and a σ value of 0.1 to 2.

2. A halogenated product as claimed in claim 1, wherein the starting low-molecular weight ethylene random copolymer contains 40% to 60% by mole of the ethylene component and 40% to 60% by mole of the alpha-olefin component.

3. A halogenated product as claimed in claim 1, wherein the starting low-molecular weight ethylene random copolymer has a σ value of 0.1 to 2.

4. A halogenated product as claimed in claim 1, wherein said halogen content is 10% to 50% by weight.

5. A halogenated product as claimed in claim 1, wherein said intrinsic viscosity [η] is 0.01 to 0.3 dl/g.

6. A halogenated product as claimed in claim 1, wherein said number-average molecular weight is 300 to 5000.

7. A halogenated product as claimed in claim 1, wherein said molecular weight distribution $\overline{M}w/\overline{M}n$ is 1.5 to 3.

8. A process for producing the halogenated product of claim 1 comprising the step of halogenating a starting low-molecular weight liquid ethylene random copolymer comprising ethylene and at least one alpha-olefin having 3 to 20 carbon atoms with a halogen in the presence of a catalyst at a temperature of 30° C. to 150° C., whereby the halogen content of the resultant halogenated product is 5% to 75% by weight.

9. A process as claimed in claim 8, wherein the halogen is chlorine.

10. A modifier for a halogen-containing polymer comprising the halogenated product of claim 1.

* * * * *